United States Patent
Smith et al.

(10) Patent No.: US 10,165,047 B2
(45) Date of Patent: Dec. 25, 2018

(54) METHODS AND APPARATUS FOR TRANSMITTING SERVICE INFORMATION IN A NEIGHBORHOOD OF PEER-TO-PEER COMMUNICATION GROUPS

(71) Applicant: GOOGLE TECHNOLOGY HOLDINGS LLC, Mountain View, CA (US)

(72) Inventors: Dwight R. Smith, Grapevine, TX (US); David E. Halasz, Stow, OH (US); Apostolis K. Salkintzis, Athens (GR)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 963 days.

(21) Appl. No.: 14/141,513

(22) Filed: Dec. 27, 2013

(65) Prior Publication Data

US 2014/0280585 A1    Sep. 18, 2014

Related U.S. Application Data

(60) Provisional application No. 61/786,762, filed on Mar. 15, 2013.

(51) Int. Cl.
*G06F 15/16* (2006.01)
*H04L 29/08* (2006.01)
(Continued)

(52) U.S. Cl.
CPC ......... *H04L 67/1068* (2013.01); *H04L 67/16* (2013.01); *H04W 4/08* (2013.01);
(Continued)

(58) Field of Classification Search
CPC .. H04W 84/12; H04W 8/005; H04L 67/1051; H04L 67/104; H04L 12/1859; H04L 67/16
See application file for complete search history.

(56) References Cited

U.S. PATENT DOCUMENTS 7,293,109 B2    11/2007   Ott et al.
7,555,563 B2     6/2009   Ott et al.
(Continued)

OTHER PUBLICATIONS

Chakraborty, Dipanjan et al.: "Toward Distributed Service Discovery in Pervasive Computing Environments", IEEE Transactions on Mobile Computing, vol. 5, No. 2, Feb. 2006, pp. 97-112.
(Continued)

*Primary Examiner* — David R Lazaro
(74) *Attorney, Agent, or Firm* — Morgan, Lewis & Bockius LLP (57) ABSTRACT

Methods and apparatus for transmitting service information in a neighborhood of peer-to-peer communication groups are disclosed. A peer-to-peer client device connects to a peer-to-peer communication group via a peer-to-peer group owner. The peer-to-peer client generates a service notification including a category and a sub-category and transmits the service notification to the first peer-to-peer group owner. The first peer-to-peer group owner then forwards the service notification (a) to a first group member that is associated with the category and the sub-category, and (b) to a second group member that is identified as a first bridge and is associated with the category.

22 Claims, 6 Drawing Sheets

(51) Int. Cl.
  *H04W 76/14*  (2018.01)
  *H04W 4/21*  (2018.01)
  *H04W 4/08*  (2009.01)
  *H04W 4/20*  (2018.01)
  *H04W 76/02*  (2009.01)
  *H04W 84/18*  (2009.01)
  *H04W 8/00*  (2009.01)

(52) U.S. Cl.
  CPC ............. *H04W 4/206* (2013.01); *H04W 4/21* (2018.02); *H04W 8/005* (2013.01); *H04W 76/023* (2013.01); *H04W 76/14* (2018.02); *H04W 84/18* (2013.01); *H04L 67/1093* (2013.01)

(56) References Cited

U.S. PATENT DOCUMENTS

| | | | | |
|---|---|---|---|---|
| 8,903,973 | B1* | 12/2014 | Hindawi | G06F 17/30 709/217 |
| 2001/0002908 | A1* | 6/2001 | Rune | H04L 12/56 370/392 |
| 2001/0010490 | A1* | 8/2001 | Bellin | H04W 84/027 340/7.46 |
| 2003/0143982 | A1 | 7/2003 | Wolters et al. | |
| 2004/0044727 | A1* | 3/2004 | Abdelaziz | H04L 61/3065 709/203 |
| 2006/0077952 | A1* | 4/2006 | Kubsch | H04L 67/104 370/351 |
| 2006/0239197 | A1* | 10/2006 | Lieuallen | H04L 29/12132 370/238 |
| 2007/0274327 | A1* | 11/2007 | Kaarela | H04L 12/2836 370/401 |
| 2008/0109481 | A1 | 5/2008 | Catanzariti et al. | |
| 2009/0234917 | A1* | 9/2009 | Despotovic | H04L 67/104 709/204 |
| 2010/0106459 | A1* | 4/2010 | Bakalov | H04L 41/042 702/182 |
| 2010/0260173 | A1* | 10/2010 | Johnson | H04M 3/42246 370/356 |
| 2011/0286357 | A1* | 11/2011 | Haris | H04L 12/462 370/254 |
| 2012/0052863 | A1* | 3/2012 | Chien | H04W 4/203 455/436 |
| 2013/0145045 | A1* | 6/2013 | Eastlake, III | H04L 29/12028 709/245 |
| 2013/0179812 | A1* | 7/2013 | BianRosa | G06F 3/04883 715/767 |
| 2013/0231151 | A1* | 9/2013 | Kneckt | H04W 40/246 455/515 |
| 2013/0238919 | A1* | 9/2013 | Ponmudi | H04W 52/0216 713/323 |
| 2014/0129626 | A1* | 5/2014 | Smadi | H04W 4/08 709/204 |
| 2014/0226639 | A1* | 8/2014 | Yi | H04W 74/04 370/336 |
| 2014/0245163 | A1* | 8/2014 | Mubarek | G06Q 50/01 715/738 |
| 2014/0280933 | A1* | 9/2014 | Oswald | H04L 67/2828 709/225 |
| 2015/0172998 | A1* | 6/2015 | Tervonen | H04W 48/16 370/254 |
| 2015/0227268 | A1* | 8/2015 | Rathod | G06F 17/30867 715/739 |

OTHER PUBLICATIONS

Mian, Adnan Noor et al.: "A Survey of Service Discovery Protocols in Multihop Mobile Ad Hoc Networks", Pervasive computing, Published by the IEEE CS, 1536-1268/09/, 2009, pp. 66-74.

* cited by examiner

FIG. 6

METHODS AND APPARATUS FOR TRANSMITTING SERVICE INFORMATION IN A NEIGHBORHOOD OF PEER-TO-PEER COMMUNICATION GROUPS

The present disclosure relates in general to wireless communication devices, and, in particular, to methods and apparatus for transmitting service information in a neighborhood of peer-to-peer communication groups.

BACKGROUND OF THE INVENTION

Most modern wireless devices include some form of peer-to-peer wireless communication. For example, a cellular phone may exchange contact information with another cellular phone via a Bluetooth connection or execute a multiplayer game with another cellular phone via a peer-to-peer Wi-Fi connection (e.g., an 802.11 Wi-Fi connection without the need for a router).

However, these peer-to-peer mechanisms do not scale efficiently to a large number of devices. Attempts to scale these peer-to-peer mechanisms results in inefficient routing of data packets, which results in data delays and increased power consumption. In addition, these peer-to-peer mechanisms do not efficiently discover each other's services and individually interact across the network.

DETAILED DESCRIPTION OF THE PREFERRED EMBODIMENTS

Briefly, in a specific embodiment, a peer-to-peer client (e.g., a cellular phone or other computing device) generates a service notification message including a category (e.g., games), a sub-category (e.g., game title), an action (e.g., find player), a group identifier (e.g., group 1), and a device identifier (e.g., device 1). The peer-to-peer client sends the service notification to a local group owner, which in turn forwards the service notification to each member in that group that is associated with both the category and the sub-category (e.g., games and game title). The local group owner also forwards the service notification to each local bridge that is associated with the category (e.g., games). Each forwarding bridge adds addressing information (e.g., return path) and forwards the message to each neighboring group owner that is associated with the category (e.g., games). Each receiving group owner removes duplicates due to multiple paths and forwards the service notification to each of its group members that is associated with both the category and the sub-category (e.g., games and game title). Each receiving group owner also forwards the service notification to each group member that is identified as a bridge and is associated with the category (e.g., games).

This process is repeated as necessary to fully propagate the service notification throughout the appropriate portions of the neighborhood of peer-to-peer communication groups. Eventually, each peer-to-peer client that is associated with the category and the sub-category (e.g., games and game title) receives the service notification. A peer-to-peer client that receives the service notification may generate a response to the service notification (e.g., also wish to play game title). The response is forwarded from bridge to bridge via group owners based on the return path included with the original service notification until the originating peer-to-peer client receives the response message. Among other features, wireless devices using the disclosed methods and apparatus are able to dynamically form very large peer-to-peer groups, discover each other's services, and individually interact with each other in manner that reduces the consumption of power and scales efficiently.

More generally, methods and apparatus for transmitting service information in a neighborhood of peer-to-peer communication groups are disclosed. In an embodiment, an apparatus includes a service notification generator structured to generate a service notification including a category and a sub-category. The apparatus also includes a peer-to-peer connector operatively coupled to the service notification generator, the peer-to-peer connector is structured to connect a first peer-to-peer client to a first peer-to-peer communication group via a first peer-to-peer group owner and transmit the service notification from the first peer-to-peer client to the first peer-to-peer group owner. The apparatus also includes a message forwarder operatively coupled to the peer-to-peer transmitter, the message forwarder is structured to (a) forward the service notification from the peer-to-peer group owner to a first group member that is associated with the category and the sub-category in the service notification, and (b) forward the service notification from the peer-to-peer group owner to a second group member that is identified as a first bridge and is associated with the category in the service notification.

The second group member may be structured to add addressing information to the service notification and forward the service notification to a neighboring group owner that is associated with the category in the service notification. The neighboring group owner may be structured to forward the service notification to a second group member that is associated with the category and the sub-category in the service notification. The neighboring group owner may be structured to forward the service notification to a third group member that is identified as a second bridge and is associated with the category in the service notification. A second peer-to-peer client may be structured to generate a response message including the addressing information and transmits the response message to the first peer-to-peer client via a return path identified by the addressing information. The service notification may include an action associated with at least one of the category and the sub-category. The service notification may include a group identifier and a device identifier.

Figure 1:
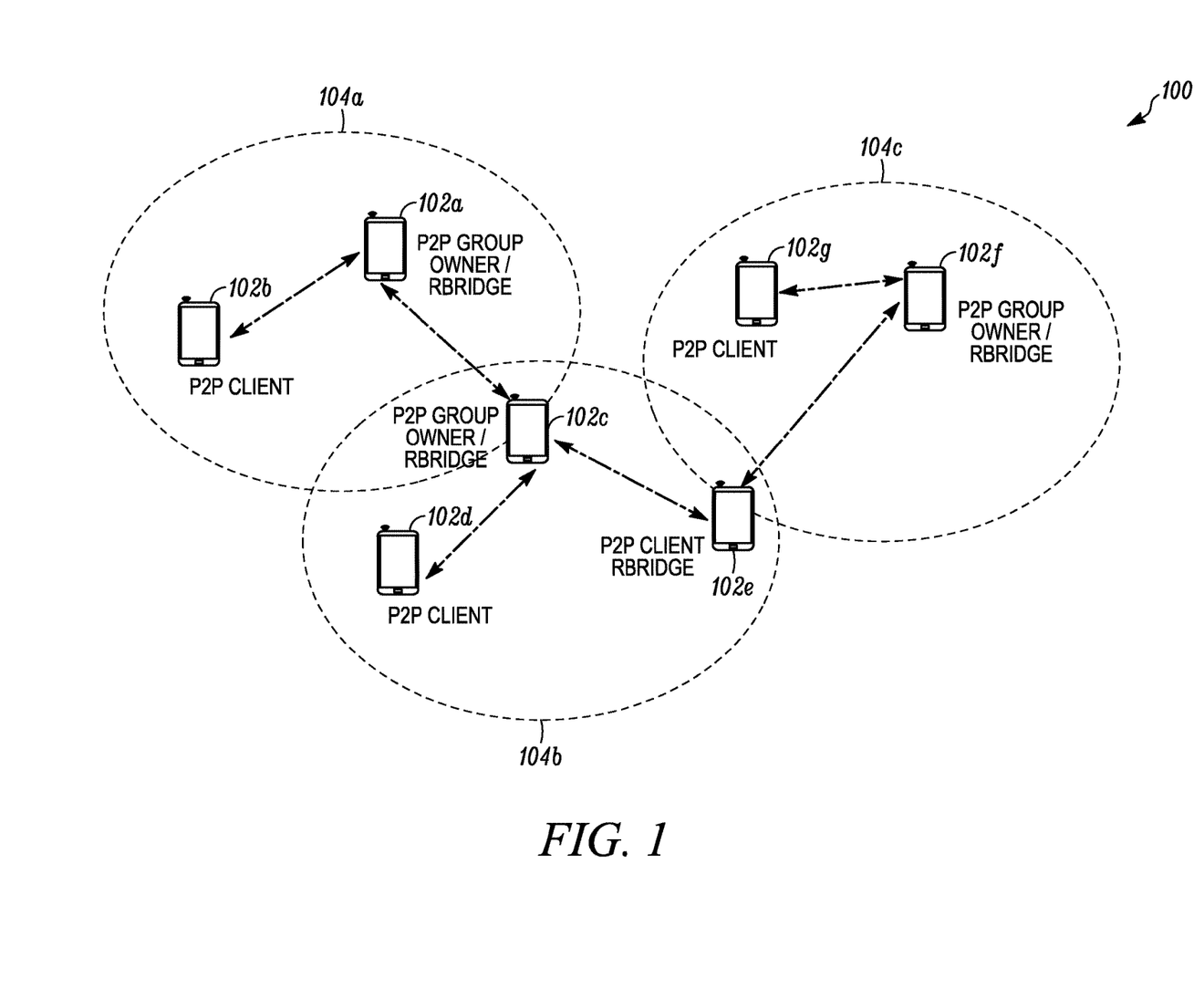
FIG. 1 is a block diagram of an example peer-to-peer neighborhood.

Turning now to the figures, a block diagram of certain elements of an example peer-to-peer neighborhood system 100 is illustrated in FIG. 1. The illustrated system 100 includes a plurality of wireless devices 102 (e.g., cellular phone, portable computer, television, camera, etc.) in a plurality of peer-to-peer groups 104*a*, 104*b*, 104*c*. Collectively, these peer-to-peer groups 104*a*, 104*b*, 104*c*, directly and/or indirectly connected, form a network neighborhood system 100. Each peer-to-peer group 104a, 104b, 104c typically includes one wireless device 102a, 102c, and 102f that acts as the peer-to-peer group owner and one or more other wireless devices 102b, 102d, 102e, and 102g that are peer-to-peer clients. Each peer-to-peer group owner wireless device 102a, 102c, and 102f operates like an access point (e.g., 802.11 Wi-Fi router) for client wireless devices 102b, 102d, 102e, and 102g in that peer-to-peer group 104a, 104b, 104c, even though in this example, each peer-to-peer group owner wireless device 102a, 102c, and 102f does not have a direct connection to a network infrastructure.

A peer-to-peer group 104a, 104b, 104c may be wirelessly connected to one or more other peer-to-peer groups 104a, 104b, 104c via one or more of the wireless devices 102. In such an instance, a wireless device 102 connecting peer-to-peer groups 104a, 104b, 104c operates a bridge. For example, the connecting wireless device 102 may operate a routing bridge (i.e., RBridge). RBridges forward Ethernet packets emitted by end nodes that do not implement layer 3 of the Open Systems Interconnection (OSI) model. Wireless devices 102 operating a bridge may be peer-to-peer group owners and/or clients.

The example shown in FIG. 1 includes three peer-to-peer groups 104a, 104b, and 104c. The peer-to-peer group 104a includes a peer-to-peer group owner wireless device 102a and two peer-to-peer client wireless devices 102b and 102c. The peer-to-peer group 104b includes a peer-to-peer group owner wireless device 102c and two peer-to-peer client wireless devices 102d and 102e. In this example, wireless device 102c is both a client device in peer-to-peer group 104a and the peer-to-peer group owner in peer-to-peer group 104b. Wireless device 102c is a client of the group 104a and an owner of the group 104b. The peer-to-peer group 104c includes a peer-to-peer group owner wireless device 102f and two peer-to-peer client wireless devices 102g and 102e. Wireless device 102e is a client in of the group 104b and a client of the group 104c.

The group owner wireless device 102a runs an RBridge, which forms one side of a connection between group 104a and group 104b. The group owner wireless device 102c runs another RBridge, which forms the other side of the connection between group 104a and group 104b. The client wireless device 102e runs an RBridge, which forms one side of a connection between group 104b and group 104c. The group owner wireless device 102f runs another RBridge, which forms the other side of the connection between group 104b and group 104c.

Any wireless device 102 in the system 100 may communicate with any other wireless device 102 in the system 100. For example, wireless device 102b may send a message to wireless device 102g. In this example, the message travels from wireless device 102b to wireless device 102a. Wireless device 102a, acting as a group owner and a bridge, determines that the destination for the message is not in group 104a. Accordingly, wireless device 102a forwards the message to wireless device 102c. Wireless device 102c, acting as a group owner and a bridge, determines that the destination for the message is not in group 104b. Accordingly, wireless device 102c forwards the message to wireless device 102e. Wireless device 102e is not a group owner. Accordingly, wireless device 102e forwards the message to wireless device 102f. Wireless device 102f, acting as a group owner and a bridge, determines that the destination for the message is in group 104c. Accordingly, wireless device 102f forwards the message to its final destination, wireless device 102g.

Figure 2:
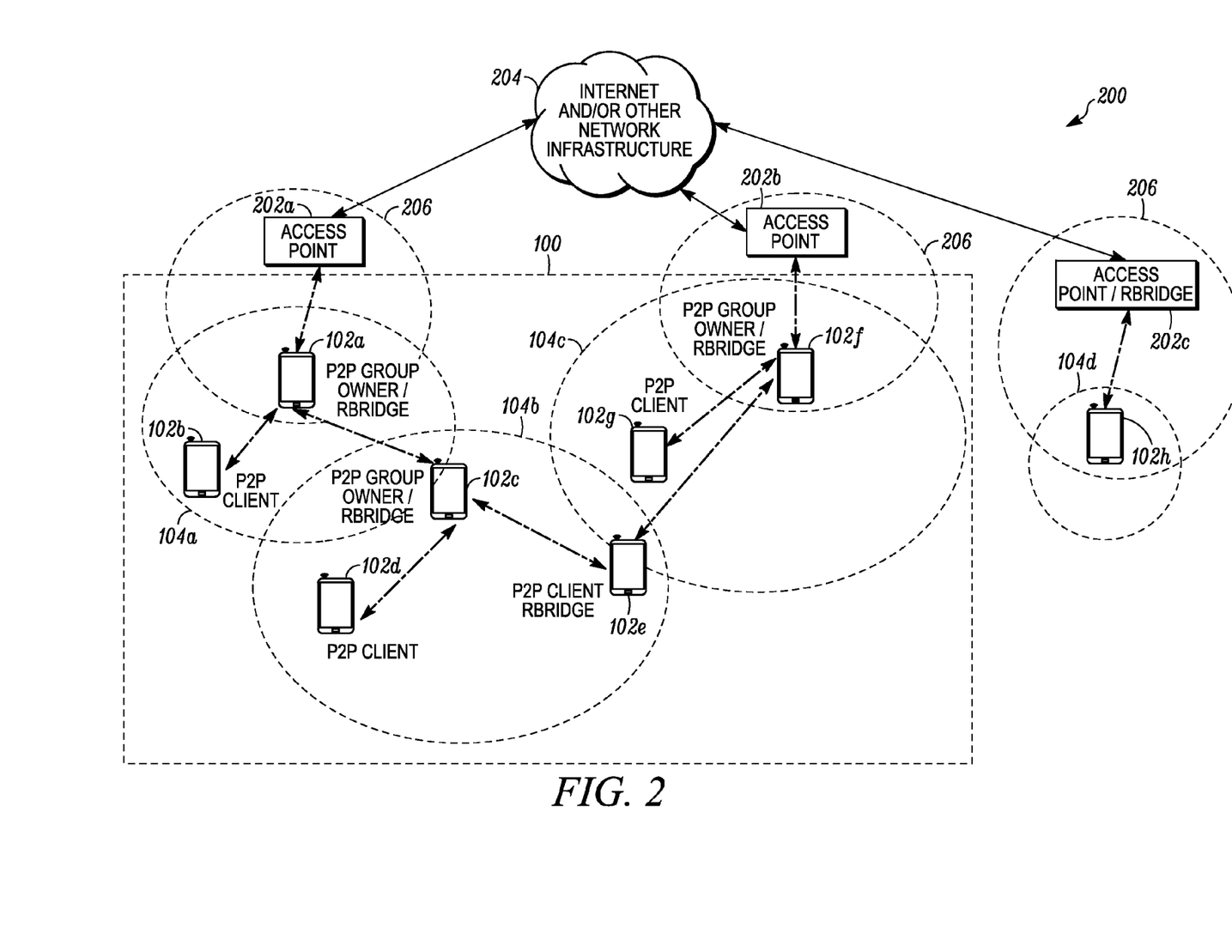
FIG. 2 is a block diagram of another example peer-to-peer neighborhood.

A block diagram of certain elements of another example peer-to-peer neighborhood system 200 is illustrated in FIG. 2. The example system 200, like the example system 100 (which is included as a subset of example system 200), includes a plurality of wireless devices 102 (e.g., cellular phone, portable computer, television, camera, etc.) in a plurality of peer-to-peer groups 104a, 104b, 104c, 104d. Again, each peer-to-peer group 104a, 104b, 104c, 104d typically includes one wireless device 102a, 102c, and 102f that acts as the peer-to-peer group owner wireless device 102a, 102c, and 102f and one or more other wireless devices 102 that are peer-to-peer clients. Each peer-to-peer group owner wireless device 102a, 102c, and 102f operates like an access point (e.g., 802.11 Wi-Fi router) for clients in that peer-to-peer group 104a, 104b, 104c, 104d.

In addition, in this example, each peer-to-peer group owner wireless device 102a, 102c, and 102f has a wireless connection to an access point 202, which in turn has a direct connection to a network infrastructure 204. The network infrastructure 204 may be any suitable network infrastructure 204 such as the Internet and/or some other wired and/or wireless data network, including, but not limited to, any suitable wide area network or local area network.

As described above with reference to FIG. 1, each peer-to-peer group 104a, 104b, 104c, 104d may be wirelessly connected to one or more other peer-to-peer groups 104a, 104b, 104c, 104d via one or more of the wireless devices 102. In such an instance, a wireless device 102 connecting peer-to-peer groups 104a, 104b, 104c, 104d operates a bridge. For example, the connecting wireless device 102 may operate an RBridge. Wireless devices 102 operating a bridge may be peer-to-peer group owners and/or clients.

In addition, each peer-to-peer group 104a, 104b, 104c, 104d may be connected to one or more other peer-to-peer groups 104a, 104b, 104c, 104d via an access point 202 and the network infrastructure 204. In such an instance, either a wireless device 102 connecting the group 104a, 104b, 104c, 104d to the access point 202 may operate the bridge or the access point 202 may operate the bridge. For example, the wireless device 102 and/or the access point 202 may operate an RBridge.

Any wireless device 102 in the system 200 may communicate with any other wireless device 102 in the system 200. For example, wireless device 102b may send a message to wireless device 102h. In this example, the message travels from wireless device 102b to wireless device 102a. Wireless device 102a, acting as a group owner and a bridge, determines that the destination for the message is not in group 104a. Accordingly, wireless device 102a forwards the message to access point 202a. Access point 202a forwards the message to access point 202c via the network infrastructure 204. Access point 202c, acting as a bridge, determines that the destination for the message is in group 104d. Accordingly, access point 202c forwards the message to its final destination, wireless device 102h.

Figure 3:
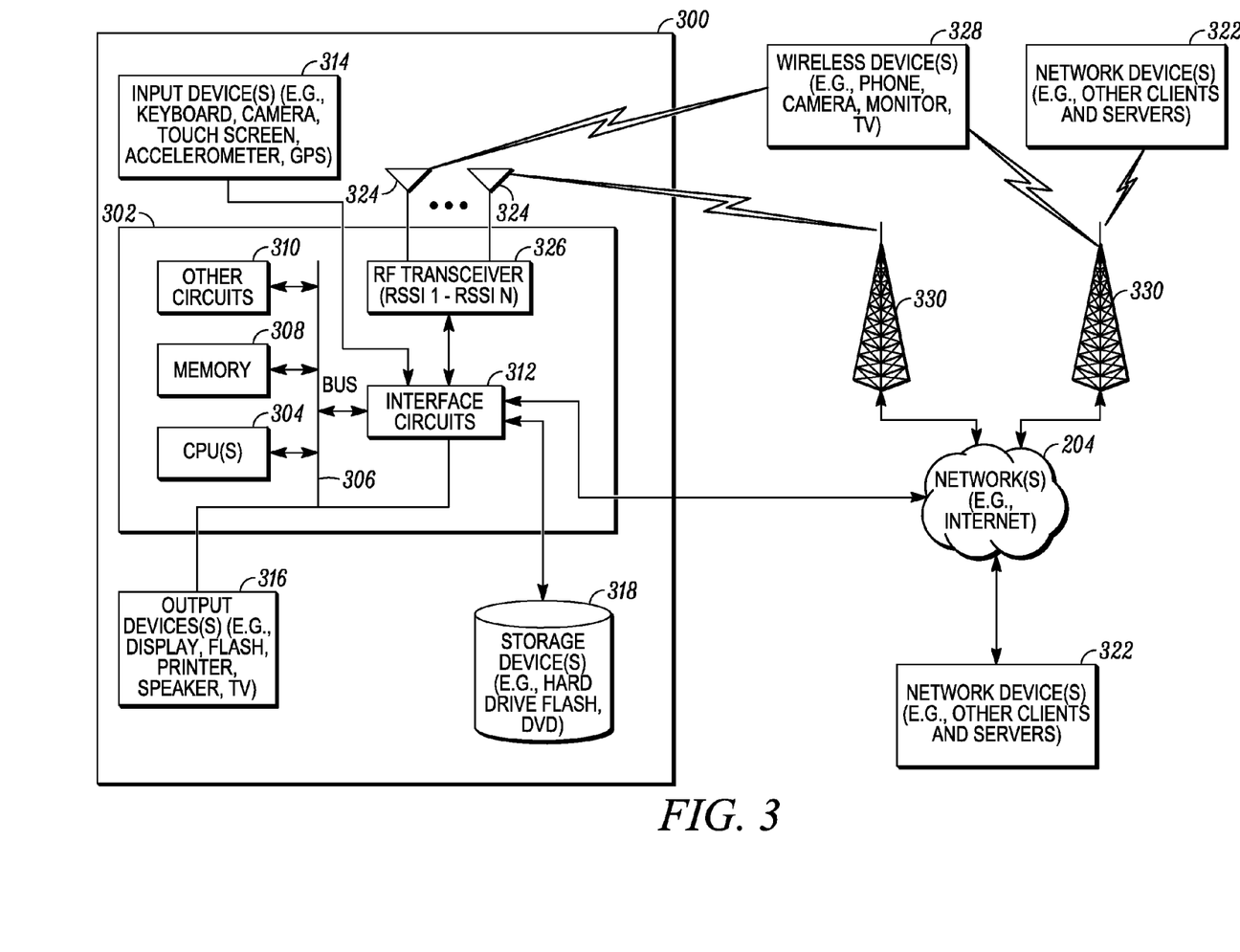
FIG. 3 is a block diagram of an example electronic device.

Each of the devices illustrated in FIG. 1 and FIG. 2 (e.g., wireless device 102 and/or access point 204) may include certain common aspects of many electronic devices such as microprocessors, memories, peripherals, etc. A block diagram of certain elements of an example electronic device 300 is illustrated in FIG. 3. The example electrical device 300 includes a main unit 302 which may include, if desired, one or more physical processors 304 electrically coupled by an address/data bus 306 to one or more memories 308, other computer circuitry 310, and one or more interface circuits 312. The processor 304 may be any suitable processor or plurality of processors. For example, the electrical device 300 may include a central processing unit (CPU) and/or a graphics processing unit (GPU).

The memory 308 may include various types of non-transitory memory including volatile memory and/or non-volatile memory such as, but not limited to, distributed memory, read-only memory (ROM), random access memory (RAM) etc. The memory 308 typically stores a software program that interacts with the other devices in the system as described herein. This program may be executed by the processor 304 in any suitable manner. The memory 308 may also store digital data indicative of documents, files, programs, web pages, etc. retrieved from a server and/or loaded via an input device 314.

The interface circuit 312 may be implemented using any suitable interface standard, such as an Ethernet interface and/or a Universal Serial Bus (USB) interface. One or more input devices 314 may be connected to the interface circuit 312 for entering data and commands into the main unit 302. For example, the input device 314 may be a keyboard, mouse, touch screen, track pad, isopoint, camera, voice recognition system, accelerometer, global positioning system (GPS), and/or any other suitable input device.

One or more displays, printers, speakers, monitors, televisions, high definition televisions, and/or other suitable output devices 316 may also be connected to the main unit 302 via the interface circuit 312. The display 316 may be a cathode ray tube (CRTs), liquid crystal displays (LCDs), electronic ink (e-ink), and/or any other suitable type of display. The display 316 generates visual displays of data generated during operation of the device 300. For example, the display 316 may be used to display web pages and/or other content received from a server 106 and other device. The visual displays may include prompts for human input, run time statistics, calculated values, data, etc.

One or more storage devices 318 may also be connected to the main unit 302 via the interface circuit 312. For example, a hard drive, CD drive, DVD drive, and/or other storage devices may be connected to the main unit 302. The storage devices 318 may store any type of data used by the device 300.

The electrical device 300 may also exchange data with other network devices 322 via a connection to a network 110. The network connection may be any type of network connection, such as an Ethernet connection, digital subscriber line (DSL), telephone line, coaxial cable, wireless base station 330, etc. Users 114 of the system 100 may be required to register with a server 106. In such an instance, each user 114 may choose a user identifier (e.g., e-mail address) and a password which may be required for the activation of services. The user identifier and password may be passed across the network 110 using encryption built into the user's browser. Alternatively, the user identifier and/or password may be assigned by the server 106.

In some embodiments, the device 300 may be a wireless device 300. In such an instance, the device 300 may include one or more antennas 324 connected to one or more radio frequency (RF) transceivers 326. The transceiver 326 may include one or more receivers and one or more transmitters operating on the same and/or different frequencies. For example, the RF transceiver 326 may be a Bluetooth® transceiver, a Wi-Fi transceiver, and diversity cellular transceivers or a combination of the different transceivers. The transceiver 326 allows the device 300 to exchange signals, such as voice, video and data, with other wireless devices 328, such as a phone, camera, monitor, television, and/or high definition television. For example, the device 300 may send and receive wireless telephone signals, text messages, audio signals and/or video signals directly and/or via a base station 330. A receive signal strength indicator (RSSI) associated with each receiver generates an indication of the relative strength or weakness of each signal being received by the device 300.

Figure 4:
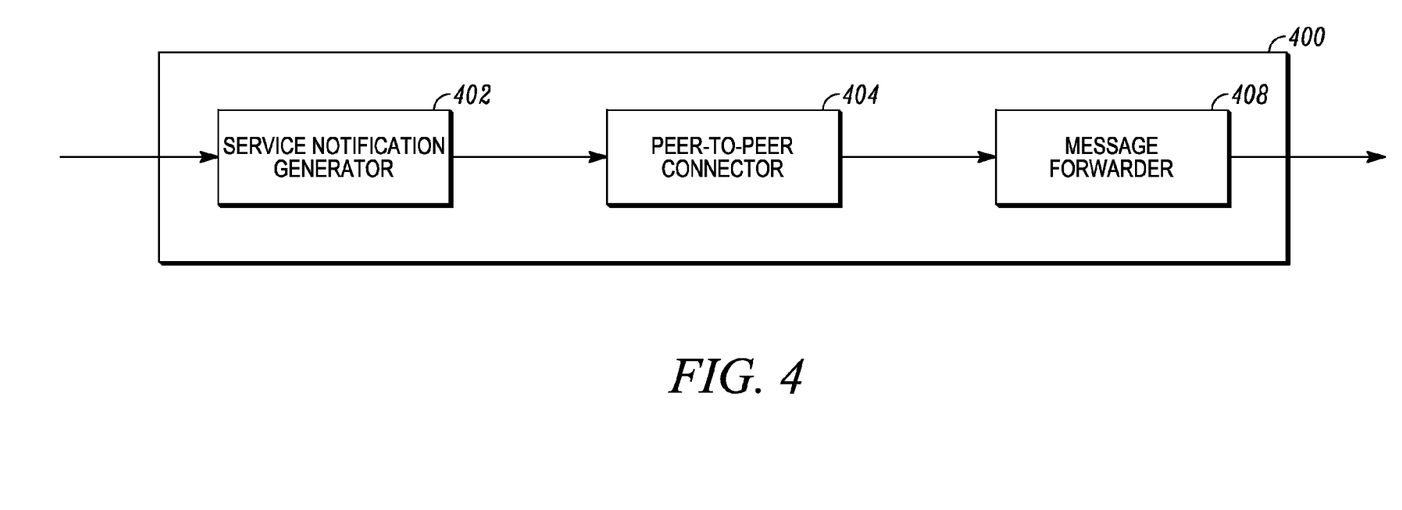
FIG. 4 is a block diagram of an example system for transmitting service information in a neighborhood of peer-to-peer communication groups.

A block diagram of certain elements of an example system 400 for transmitting service information in a neighborhood of peer-to-peer communication groups is illustrated in FIG. 4. The system 400 may be implemented in hardware or a combination of hardware and hardware executing software. In one embodiment, the system 400 includes a CPU executing software. Other suitable hardware includes one or more application specific integrated circuits (ASICs), state machines, field programmable gate arrays (FPGAs), and/or digital signal processors (DSPs).

The example system 400 includes a service notification generator 402, a peer-to-peer connector 404, and a message forwarder 408. As described in more detail below with reference to the flow charts in FIG. 5 and FIG. 6, the service notification generator 402 generates a service notification including a category and a sub-category for the service. The peer-to-peer connector 404 connects a peer-to-peer client wireless device 102 to a peer-to-peer communication group 104a, 104b, 104c, 104d via a peer-to-peer group owner wireless device 102 and transmits the service notification from the peer-to-peer client wireless device 102 to the peer-to-peer group owner wireless device 102. For example, the peer-to-peer client wireless device 102 may connect to an 802.11 Wi-Fi access point that is part of a peer-to-peer neighborhood 100. The peer-to-peer client wireless device 102 in this example may be a smart phone and the owner may be looking for someone to play a certain game. Accordingly, in this example, the category may be set to "games" and the sub-category may be set to the title of the game (e.g., chess). Any type of category and sub-category may be used. For example, a "messaging" category may have a "text" and "social media" as sub-categories. Similarly, a "sports" category may have "football" and "baseball" as sub-categories. In addition, any number of hierarchical levels may be used. For example, the "football" sub-category may have an "NFL" sub-sub-category, which may in turn have a "Chicago" sub-sub-sub-category.

The message forwarder 408 forwards the service notification from the peer-to-peer group owner wireless device 102 to group member wireless devices 102 that are associated with the category and the sub-category in the service notification. For example, if any of the other peer-to-peer client wireless devices 102 associated with that access point are looking for a chess opponent, the access point sends each of those peer-to-peer client wireless devices 102 the service notification from the first peer-to-peer client wireless device 102. However, if one or more peer-to-peer client wireless devices 102 associated with that access point are not associated with the sub-category (e.g., associated with "games," but not "chess"), the access point does not send the service notification to each of those peer-to-peer client wireless devices 102. In this manner, unnecessary network communications are avoided.

The message forwarder 408 also forwards the service notification from the peer-to-peer group owner wireless device 102 to group member wireless devices 102 that are identified as bridges and are associated with the category in the service notification. For example, the local group owner wireless device 102 forwards the service notification to other groups with at least one member interested in "games" (but not necessarily "chess"). However, in this example, the local group owner wireless device 102 does not forward the service notification to other groups that have no members interested in "games." In this manner, unnecessary network communications are avoided.

Figure 5:
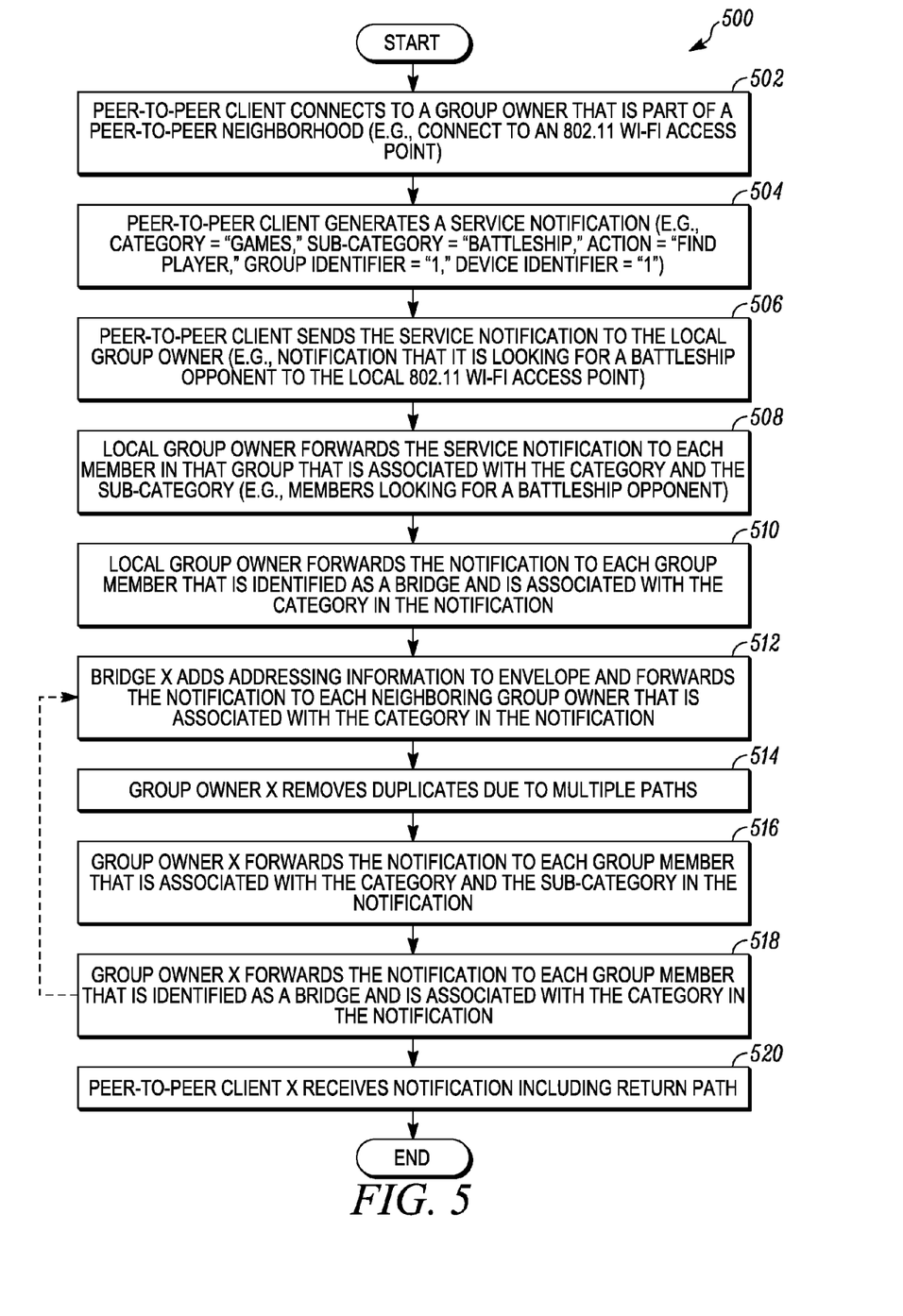
FIG. 5 is a flowchart of an example process for transmitting a service notification via a neighborhood of peer-to-peer communication groups.

A flowchart of an example process 500 for transmitting a service notification via a neighborhood of peer-to-peer communication groups is illustrated in FIG. 5. The process 500 may be carried out by one or more suitably programmed processors such as a CPU executing software (e.g., block 304 of FIG. 3). The process 500 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 500 is described with reference to the flowchart illustrated in FIG. 5, it will be appreciated that many other methods of performing the acts associated with process 500 may be used. For example, the order of many of the operations may be changed, and some of the operations described may be optional.

In general, a peer-to-peer client wireless device 102 generates a service notification message including a category (e.g., games), a sub-category (e.g., chess), an action (e.g., find player), a group identifier (e.g., group 1), and a device identifier (e.g., device 1). The group identifier and the device identifier specify the logical location of the peer-to-peer client wireless device 102 that generated the service notification message. The peer-to-peer client wireless device 102 sends the service notification to the local group owner wireless device 102, which in turn forwards the service notification to each member in that group that is associated with both the category and the sub-category (e.g., games and chess). The local group owner wireless device 102 also forwards the service notification to each local bridge that is associated with the category (e.g., games). Each forwarding bridge wireless device 102 adds addressing information (e.g., return path) and forwards the message to each neighboring group owner that is associated with the category (e.g., games). Each receiving group owner wireless device 102 removes duplicate service notifications caused by the existence of multiple communication paths and forwards the service notification to each of its group member wireless devices 102 that is associated with both the category and the sub-category (e.g., games and chess). Each receiving group owner wireless device 102 also forwards the service notification to each group member wireless device 102 that is identified as a bridge and is associated with the category (e.g., games). This process is repeated as necessary to fully propagate the service notification throughout the appropriate portions of the neighborhood 100 of peer-to-peer communication groups 104a, 104b, 104c. Eventually, each peer-to-peer client wireless device 102 that is associated with the category and the sub-category (e.g., games and chess) receives the service notification.

More specifically, the process 500 begins when a first peer-to-peer client wireless device 102 connects to a group owner wireless device 102 that is part of a peer-to-peer neighborhood (block 502). For example, the first peer-to-peer client wireless device 102 may connect to an 802.11 Wi-Fi access point that is part of a peer-to-peer neighborhood. The first peer-to-peer client wireless device 102 then generates a service notification including a category, a sub-category, an action, a group identifier, and a device identifier (block 504). For example, the first peer-to-peer client wireless device 102 may be a smart phone and the owner may be looking for someone to play the game chess. Accordingly, in this example, the category may be set to "games," the sub-category may be set to "chess," and the action may be set to "find player." The group identifier and the device identifier specify the logical location of the peer-to-peer client wireless device 102.

The first peer-to-peer client wireless device 102 then sends the service notification to the local group owner wireless device 102 (block 506). For example, the peer-to-peer client wireless device 102 may send the notification that it is looking for a chess opponent to the local 802.11 Wi-Fi access point associated with the peer-to-peer client wireless device 102. The local group owner wireless device 102 then forwards the service notification to each member in that group that is associated with the category and the sub-category in the service notification (block 508). For example, if any of the other peer-to-peer client wireless devices 102 associated with that access point are looking for a chess opponent, the access point sends each of those peer-to-peer client wireless devices 102 the service notification from the first peer-to-peer client wireless device 102. However, if one or more peer-to-peer client wireless devices 102 associated with that access point are not associated with the sub-category (e.g., associated with "games," but not "chess"), the access point does not send the service notification to each of those peer-to-peer client wireless devices 102. In this manner, unnecessary network communication is avoided.

The local group owner wireless device 102 then forwards the service notification to each group member wireless device 102 that is identified as a bridge and is associated with the category in the notification (block 510). For example, the local group owner wireless device 102 forwards the service notification to other groups with at least one member interested in "games" (but not necessarily "chess"). However, in this example, the local group owner wireless device 102 does not forward the service notification to other groups that have no members interested in "games." In this manner, unnecessary network communication is avoided.

Each forwarding bridge wireless device 102 adds addressing information to the service notification message envelope and forwards the service notification to each neighboring group owner that is associated with the category in the notification (block 512). The addressing information builds in to a return path as the service notification is propagated through the neighborhood of peer-to-peer communication groups. Each receiving group owner wireless device 102 removes duplicates due to multiple paths (block 514) and forwards the service notification to each of its group member wireless devices 102 that is associated with the category and the sub-category (e.g., associated with "games" and "chess") from the service notification (block 516).

Each receiving group owner wireless device 102 also forwards the service notification to each group member wireless device 102 that is identified as a bridge and is associated with the category in the notification (block 518). For example, the receiving group owner wireless device 102 forwards the service notification to other groups with at least one member interested in "games" (but necessarily "chess"). However, in this example, the receiving group owner wireless device 102 does not forward the service notification to other groups that have no members interested in "games." In this manner, unnecessary network communication is avoided.

Blocks 512-518 are repeated as necessary to fully propagate the service notification throughout the appropriate portions of the neighborhood of peer-to-peer communication groups. Eventually, each peer-to-peer client wireless device 102 that is associated with the category and the sub-category (e.g., associated with "games" and "chess") receives the service notification including the appropriate version of the return path (block 520).

Figure 6:
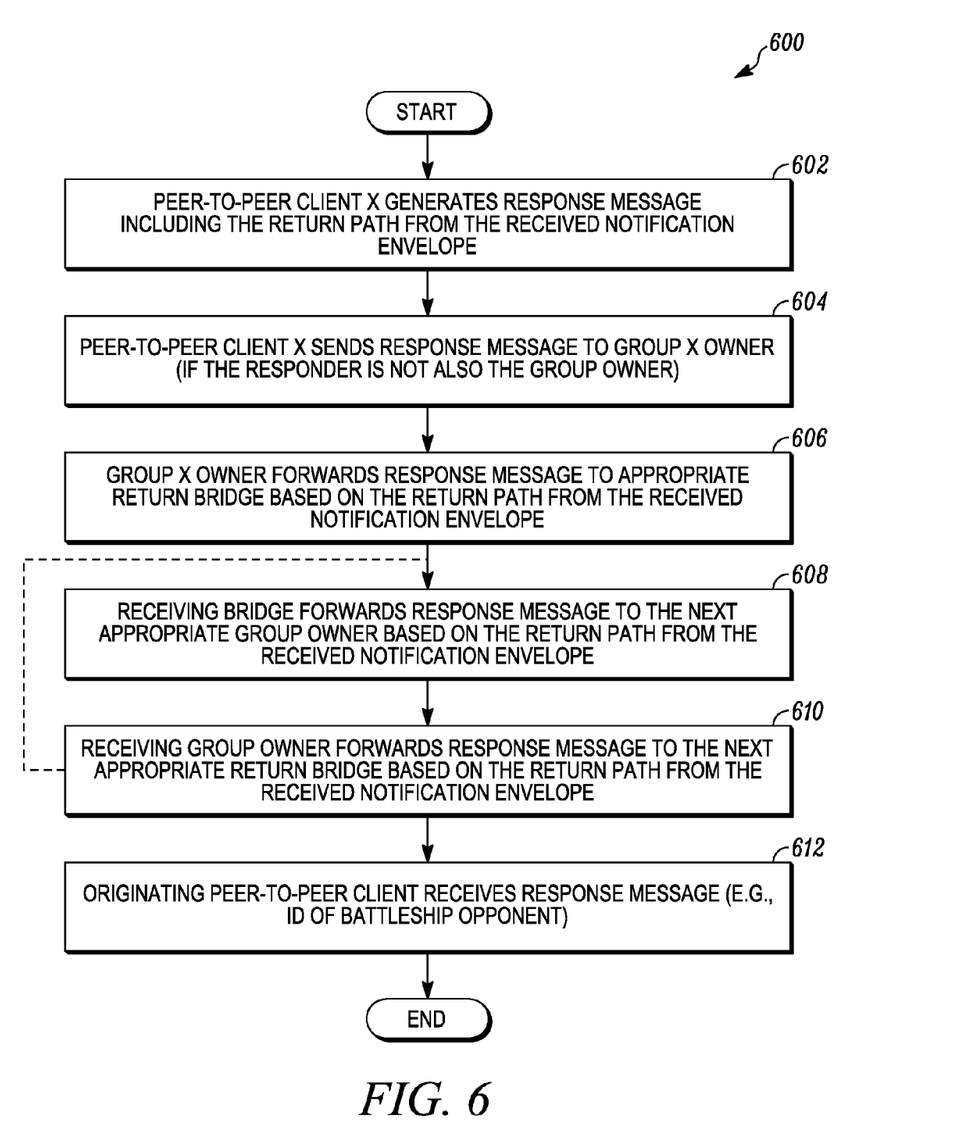
FIG. 6 is a flowchart of an example process for transmitting a response to a service notification via a neighborhood of peer-to-peer communication groups.

A flowchart of an example process 600 for transmitting a response to a service notification via a neighborhood of peer-to-peer communication groups is illustrated in FIG. 6. The process 600 may be carried out by one or more suitably programmed processors such as a CPU executing software (e.g., block 304 of FIG. 3). The process 600 may also be carried out by hardware or a combination of hardware and hardware executing software. Suitable hardware may include one or more application specific integrated circuits (ASICs), state machines, field programmable gate arrays (FPGAs), digital signal processors (DSPs), and/or other suitable hardware. Although the process 600 is described with reference to the flowchart illustrated in FIG. 6, it will be appreciated that many other methods of performing the acts associated with process 600 may be used. For example, the order of many of the operations may be changed, and some of the operations described may be optional.

In general, one or more peer-to-peer client wireless devices 102 that received a service notification may generate a response to the service notification (e.g., also wish to play chess). The response is forwarded from bridge wireless device 102 to bridge wireless device 102 via group owner wireless devices 102 based on the return path include with the original service notification until the originating peer-to-peer client wireless device 102 receives the response message.

More specifically, the process 600 begins when a peer-to-peer client wireless device 102 that received a service notification generates a response to the service notification (block 602). For example, a peer-to-peer client wireless device 102 may generates a response message indicating a desire to participate in the chess game. The response message includes the return path from the received service notification envelope.

The responding peer-to-peer client wireless device 102 sends the response message to the local group owner (if the responder is not also the group owner) (block 604). The local group owner wireless device 102 then forwards the response message to the appropriate return path RBridge wireless device 102 based on the return path from the received notification envelope (block 606). By using the return path received with the notification in block 520 of FIG. 5, unnecessary network communication is avoided.

The receiving bridge wireless device 102 then forwards the response message to the next appropriate group owner wireless device 102 based on the return path from the received notification envelope (block 608), and the receiving group owner in turn forwards the response message to the next appropriate return bridge based on the return path from the received notification envelope. This process of forwarding the response message from bridge wireless device 102 to bridge wireless device 102 via group owner wireless devices 102 based on the return path is repeated as necessary until the originating peer-to-peer client wireless device 102 receives the response message (block 610). For example, the originating peer-to-peer client wireless device 102 may receive the group identifier and the device identifier of a chess opponent.

In summary, persons of ordinary skill in the art will readily appreciate that methods and apparatus for transmitting service information in a neighborhood of peer-to-peer communication groups have been provided. Among other features, wireless devices using the disclosed methods and apparatus are able to dynamically form very large peer-to-peer groups, discover each other's services, and individually interact with each other in manner that consumes very little power and scales efficiently.

The foregoing description has been presented for the purposes of illustration and description. It is not intended to be exhaustive or to limit the invention to the exemplary embodiments disclosed. Many modifications and variations are possible in light of the above teachings. It is intended that the scope of the invention be limited not by this detailed description of examples, but rather by the claims appended hereto.

What is claimed is:

1. A method of transmitting service information in a neighborhood of peer-to-peer communication groups, wherein the neighborhood includes at least a first peer-to-peer communication group of electronic devices and a second peer-to-peer communication group of electronic devices, the method comprising:
   at a peer-to-peer group owner electronic device of the first peer-to-peer communication group, wherein the first peer-to-peer communication group further includes a first member electronic device, and the second peer-to-peer communication group includes a second member electronic device:
   communicatively coupling a first peer-to-peer client electronic device to the first peer-to-peer communication group;
   receiving a service notification including a category and a sub-category related to a requested service from the first peer-to-peer client electronic device, wherein the service notification is configured to solicit a response from client electronic devices, in the neighborhood, that satisfy the category and the sub-category;
   propagating the service notification throughout at least part of the neighborhood, including:
      in accordance with a determination that the first member electronic device is in the first peer-to-peer communication group and a determination that the first member electronic device is associated with both the category and the sub-category, transmitting the service notification to the first member electronic device in the first peer-to-peer communication group; and
      in accordance with a determination that the second member electronic device is a first bridge to the second peer-to-peer communication group and a determination that the second member electronic device is associated with at least the category, transmitting the service notification to the second member electronic device in the second peer-to-peer communication group; and
   in response to the service notification:
      receiving a response message from the second member electronic device, wherein the response message comprises addressing information indicating an address return path to the first peer-to-peer client electronic device; and
      transmitting the response message to the first peer-to-peer client electronic device based at least in part on the address return path.

2. The method of claim 1, wherein the second member electronic device is configured to add the addressing information to the service notification and to forward the service notification to a neighboring group owner electronic device that is associated with the category in the service notification.

3. The method of claim 2, wherein the neighboring group owner electronic device is configured to remove duplicate service notifications.

4. The method of claim 2, wherein the neighboring group owner electronic device is configured to forward the service notification to the second member electronic device that is associated with the category and the sub-category in the service notification.

5. The method of claim 2, comprising forwarding the service notification from the neighboring group owner electronic device to a third member electronic device of a third group of electronic devices that is identified as a second bridge and is associated with the category in the service notification.

6. The method of claim 1, wherein a second peer-to-peer client electronic device is configured to receive the service notification including the addressing information.

7. The method of claim 1, wherein the service notification includes an action associated with at least one of the category and the subcategory.

8. The method of claim 1, wherein the service notification includes a group identifier and a device identifier.

9. The method of claim 1, wherein connecting to the first peer-to-peer communication group of electronic devices comprises connecting to a Wi-Fi peer-to-peer communication group.

10. The method of claim 1, wherein the first bridge comprises a Transparent Interconnection of Lots of Links (TRILL) Routing Bridge (RBridge) interface.

11. The method of claim 1, wherein the second member electronic device is associated with the category when at least one member of the second peer-to-peer communication group of electronic devices is interested in or can provide the requested service in the category.

12. An apparatus for transmitting service information in a neighborhood of peer-to-peer communication groups, wherein the neighborhood includes at least a first peer-to-peer communication group of electronic devices and a second peer-to-peer communication group of electronic devices, the apparatus comprising:
  a plurality of radio frequency transceivers; and
  at least one controller, operatively coupled to the plurality of radio frequency transceivers, the at least one controller being structured to:
    at a peer-to-peer group owner electronic device of the first peer-to-peer communication group, wherein the first peer-to-peer communication group further includes a first member electronic device, and the second peer-to-peer communication group includes a second member electronic device:
    communicatively couple a first peer-to-peer client electronic device to the first peer-to-peer communication group;
    receive a service notification including a category and a sub-category related to a requested service from the first peer-to-peer client electronic device, wherein the service notification is configured to solicit a response from client electronic devices, in the neighborhood, that satisfy the category and the sub-category;
    propagate the service notification throughout at least part of the neighborhood, including:
      in accordance with a determination that the first member electronic device is in the first peer-to-peer communication group and a determination that the first member electronic device is associated with both the category and the sub-category, transmitting the service notification to the first member electronic device in the first peer-to-peer communication group; and
      in accordance with a determination that the second member electronic device is a first bridge to the second peer-to-peer communication group and a determination that the second member electronic device is associated with at least the category, transmitting the service notification to the second member electronic device in the second peer-to-peer communication group; and
    in response to the service notification:
      receive a response message from the second member electronic device, wherein the response message comprises addressing information indicating an address return path to the first peer-to-peer client electronic device; and
      transmit the response message to the first peer-to-peer client electronic device based at least in part on the address return path.

13. The apparatus of claim 12, wherein the second member electronic device is configured to add the addressing information to the service notification and to forward the service notification to a neighboring group owner electronic device that is associated with the category in the service notification.

14. The apparatus of claim 13, wherein the neighboring group owner electronic device is configured to remove duplicate service notifications.

15. The apparatus of claim 13, wherein the neighboring group owner electronic device is configured to forward the service notification to the second member electronic device that is associated with the category and the sub-category in the service notification.

16. The apparatus of claim 13, wherein the neighboring group owner electronic device is configured to forward the service notification to a third member electronic device of third group of electronic devices that is identified as a second bridge and is associated with the category in the service notification.

17. The apparatus of claim 13, wherein a second peer-to-peer electronic device is configured to receive the service notification including the addressing information.

18. The apparatus of claim 12, wherein the service notification includes an action associated with at least one of the category and the sub-category.

19. The apparatus of claim 12, wherein the service notification includes a group identifier and a device identifier.

20. The apparatus of claim 12, wherein the at least one controller is configured to connect to the first peer-to-peer communication group of electronic devices by connecting to a Wi-Fi peer-to-peer communication group owner electronic device.

21. The apparatus of claim 12, wherein the at least one controller is configured to instantiate the first bridge by instantiating a Transparent Interconnection of Lots of Links (TRILL) Routing Bridge (RBridge) interface.

22. The apparatus of claim 12, wherein the category comprises an identifier of an executable application, and wherein the subcategory comprises a title of the executable application.

* * * * *